United States Patent
Xiao et al.

(10) Patent No.: US 7,887,721 B2
(45) Date of Patent: Feb. 15, 2011

(54) PROCESS FOR PREPARING A POSITIVE ELECTRODE MATERIAL FOR LITHIUM ION BATTERY

(75) Inventors: Feng Xiao, Shenzhen (CN); Jianchang Zhang, Shenzhen (CN); Wenyu Cao, Shenzhen (CN); Dengwei Liu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 80 days.

(21) Appl. No.: 12/091,796

(22) PCT Filed: Mar. 3, 2006

(86) PCT No.: PCT/CN2006/000316

§ 371 (c)(1),
(2), (4) Date: Aug. 19, 2008

(87) PCT Pub. No.: WO2007/048283

PCT Pub. Date: May 3, 2007

(65) Prior Publication Data

US 2009/0146115 A1 Jun. 11, 2009

(30) Foreign Application Priority Data

Oct. 27, 2005 (CN) .......................... 2005 1 0114482

(51) Int. Cl.
*H01B 1/02* (2006.01)
(52) U.S. Cl. .................. 252/521.2; 423/179.5; 427/115; 429/223; 429/231.1; 429/231.3
(58) Field of Classification Search ............ 252/519.15, 252/521.2; 423/179.5, 594; 427/115; 429/223, 429/231.1, 231.3
See application file for complete search history.

(56) References Cited

U.S. PATENT DOCUMENTS

| | | | | |
|---|---|---|---|---|
| 4,216,247 | A | * | 8/1980 | Ikeda et al. .................. 427/115 |
| 5,427,875 | A | * | 6/1995 | Yamamoto et al. .......... 429/223 |
| 5,718,989 | A | | 2/1998 | Aoki et al. |
| 5,795,558 | A | | 8/1998 | Aoki et al. |
| 6,242,134 | B1 | * | 6/2001 | Fujiwara et al. ............. 429/223 |
| 6,949,233 | B2 | * | 9/2005 | Kweon et al. ............ 423/179.5 |
| 2002/0110518 | A1 | * | 8/2002 | Okuda et al. ................ 423/594 |

(Continued)

FOREIGN PATENT DOCUMENTS

CN 1356736 A 7/2002

(Continued)

*Primary Examiner*—Mark Kopec
*Assistant Examiner*—Khanh Tuan Nguyen
(74) *Attorney, Agent, or Firm*—Volpe and Koenig, PC

(57) ABSTRACT

A process for preparing lithium-nickel-manganese-cobalt composite oxide used as a positive electrode material for the lithium ion battery, comprising subjecting a mixture containing a lithium compound and nickel-manganese-cobalt hydroxide to a first-stage sintering and a second-stage sintering. The process includes adding a binder and/or binder solution after the first-stage sintering, and the mixture of the binder and/or binder solution and the product of first-stage sintering is sintered in the second-stage sintering. The tap density and volume specific capacity of the positive electrode material lithium-nickel-manganese-cobalt composite oxide prepared by the process, come up to 2.4 g/cm$^3$ and 416.4 mAh/cm$^3$, respectively. Besides, the positive electrode material lithium-nickel-manganese-cobalt composite oxide prepared by the process possesses the advantages of high specific capacity and good cycle stability.

12 Claims, 2 Drawing Sheets

U.S. PATENT DOCUMENTS

| | | | |
|---|---|---|---|
| 2003/0082452 A1* | 5/2003 | Ueda et al. | 429/231.1 |
| 2003/0170540 A1* | 9/2003 | Ohzuku et al. | 429/231.1 |
| 2004/0091779 A1* | 5/2004 | Kang et al. | 429/231.1 |
| 2004/0253516 A1* | 12/2004 | Yuasa et al. | 429/231.3 |
| 2008/0096111 A1* | 4/2008 | Ohzuku et al. | 429/223 |
| 2009/0146115 A1* | 6/2009 | Xiao et al. | 252/519.15 |

FOREIGN PATENT DOCUMENTS

| | | |
|---|---|---|
| CN | 1547277 A | 2/2004 |
| CN | 1767236 A | 5/2005 |
| CN | 1622371 A | 6/2005 |
| CN | 1665053 A | 9/2005 |
| JP | 2000-277110 | * 10/2000 |
| JP | 2005-100947 | * 4/2005 |
| JP | 2005-150102 | * 6/2005 |

* cited by examiner

US 7,887,721 B2

PROCESS FOR PREPARING A POSITIVE ELECTRODE MATERIAL FOR LITHIUM ION BATTERY

FIELD OF INVENTION

The present invention relates to a process for preparing a positive electrode material for lithium ion battery, and in particular relates to a process for preparing lithium-nickel-manganese-cobalt composite oxide used as the positive electrode material for lithium ion battery.

BACKGROUND

The lithium ion battery possesses advantages of high energy, long life, little pollution, and etc, so it is widely applied in a variety of fields such as portable electronic facilities, electric automobiles, and etc. Positive electrode materials play an important role in the production of the lithium ion battery, since the quality of the positive electrode material directly determines the performances of the final secondary batteries whose cost also depends on the cost of the positive electrode material.

The positive electrode materials for the lithium ion battery widely studied presently include transition metal oxides $LiCoO_2$ and $LiNiO_2$ with layer structure, $LiMn_2O_4$ with spinel structure, and $LiFePO_4$ with olivine structure. Each of the four materials has its advantages and disadvantages. For example, $LiCoO_2$ possesses excellent comprehensive performance, so it is the sole positive electrode material commercialized in a large scale presently, but it has the disadvantages of high price, low capacity and high toxicity, and may bring on some safety problems. $LiNiO_2$ possesses the advantages of low cost and high capacity, but it is difficult to prepare, and the prepared material has poor uniformity and reproducibility performances, and may bring on severe safety problems. $LiMn_2O_4$ with spinel structure possesses the advantages of low cost and good security, but its cycle performance, especially at a high temperature, is poor, and it is somewhat soluble in the electrolyte, resulting in a poor storage performance.

It is discovered recently that the comprehensive performances of the material may be highly improved and the cost may be lowered by partly replacing cobalt with nickel and manganese. For example, a novel positive electrode material, $LiNi_{1/3}Co_{1/3}Mn_{1/3}O_2$, possesses most advantages of each positive electrode material $LiCoO_2$, $LiNiO_2$, and $LiMn_2O_4$, such as low cost, high voltage platform, large reversible capacity (160-190 mAh/g), stable structure, good cycle performance, and mild preparation conditions. The preparation and performance of $LiNi_xMn_yCo_{1-x-y}O_2$ have been reported in many literatures, and the high temperature solid phase method and coprecipitation method are generally used to prepare the material. For example, CN 1595680A discloses a process for preparing a positive electrode material for lithium ion batteries, which comprises mixing the coprecipitated hydroxide, carbonate or oxide of nickel, manganese and at least one of cobalt, titanium, and aluminum with lithium hydroxide or lithium carbonate; loosely piling-up the mixture and pelleting on a press machine; calcining at high temperature in solid phase; and pulverizing after cooling to obtain the positive electrode material.

CN 1547277A discloses a manganese-nickel-cobalt composite lithium-embedded oxide and its preparation process, which comprises preparing a mixed solution consisting of a manganese salt, nickel salt, and cobalt salt according to a mole ratio of Mn:Ni:Co=1:(0.8-1.2):(0.1-1), heating to 20-90° C., adding excessive alkali under stirring, separating the composite manganese-nickel-cobalt hydroxide obtained by precipitation, calcining the above composite hydroxide at 100-700° C. to yield a composite manganese-nickel-cobalt oxide, mixing a lithium-source substance into the composite manganese-nickel-cobalt oxide, calcining the mixture at 700-1000° C. for 6-36 hours, cooling, and pulverizing to yield the final product.

CN 1614801A discloses a process for preparing a multi-element composite positive electrode material for the lithium ion battery, which comprises using compounds of nickel, cobalt, and manganese as feed stocks to prepare a solution with a total concentration of 0.05-10 mol/L, mixing said solution with an alkaline solution of 0.05-10 mol/L, adding an additive at the same time, stirring to form a uniform precipitate, drying the precipitate, mixing it with a lithium compound, pulverizing in a ball-mill, and calcining the mixture at 400-1000° C. for 1-30 hours to yield the product. The additive used in this process is a surfactant sodium dodecyl benzene sulfonate or PVP for suppressing the agglomeration of the crystal nuclei.

CN 1622371A discloses a process for preparing high density spheric lithium nickel-cobalt-manganate used as a positive electrode material for the lithium ion battery, which comprises continuously pumping a mixed aqueous solution of a nickel salt, cobalt salt, and manganese salt, an aqueous solution of sodium hydroxide, and an aqueous solution of ammonia respectively into a reactor equipped with a stirrer, reacting the above solutions while controlling the flow rates of the mixed aqueous solution of nickel-cobalt-manganese salts and the aqueous solution of ammonia and the reaction conditions to yield a spheric or near-spheric precursor of nickel-cobalt-manganese hydroxide $Ni_{1/3}Co_{1/3}Mn_{1/3}(OH)_2$, uniformly mixing it with lithium carbonate after washing and drying, and thermally treating in air at 750-950° C. for 8-48 hours to yield spheric lithium nickel-cobalt-manganate.

The above various processes possess the advantages of low cost, mild preparation conditions, low price, and etc, and the structure of the prepared positive electrode materials is stable, but there is a common shortcoming, i.e. the tap densities of the prepared positive electrode materials are low, leading to low volume specific capacities of the batteries.

SUMMARY OF THE INVENTION

An object of the present invention is to provide a process for preparing lithium-nickel-manganese-cobalt composite oxide with a high tap density used as a positive electrode material for the lithium ion battery, in order to overcome the disadvantage of the prior preparation processes that the prepared positive electrode material lithium-nickel-manganese-cobalt composite oxide has low tap density.

The present invention provides a process for preparing lithium-nickel-manganese-cobalt composite oxide used as a positive electrode material for the lithium ion battery, which comprises subjecting a mixture containing a lithium compound and nickel-manganese-cobalt hydroxide to a first-stage sintering and a second-stage sintering, wherein said process further comprises adding a binder and/or binder solution after the first-stage sintering, and the mixture of the binder and/or binder solution and the product of first-stage sintering is sintered in the second-stage sintering.

According to the process of the present invention, the tap density of the positive electrode material can be significantly enhanced by sintering the binder together with the product of the first-stage sintering in the second-stage sintering, since the binding effect of the binder can improve the apparent morphology of the material. The tap density and volume specific capacity of the positive electrode material lithium-nickel-manganese-cobalt composite oxide prepared by the process of the present invention come up to 2.4 g/cm$^3$ and 416.4 mAh/cm$^3$, respectively. Besides, the positive electrode material prepared by the process of the present invention possesses the advantages of high specific capacity and good cycle stability.

DETAILED DESCRIPTION OF THE PREFERRED EMBODIMENTS

Figure 1:
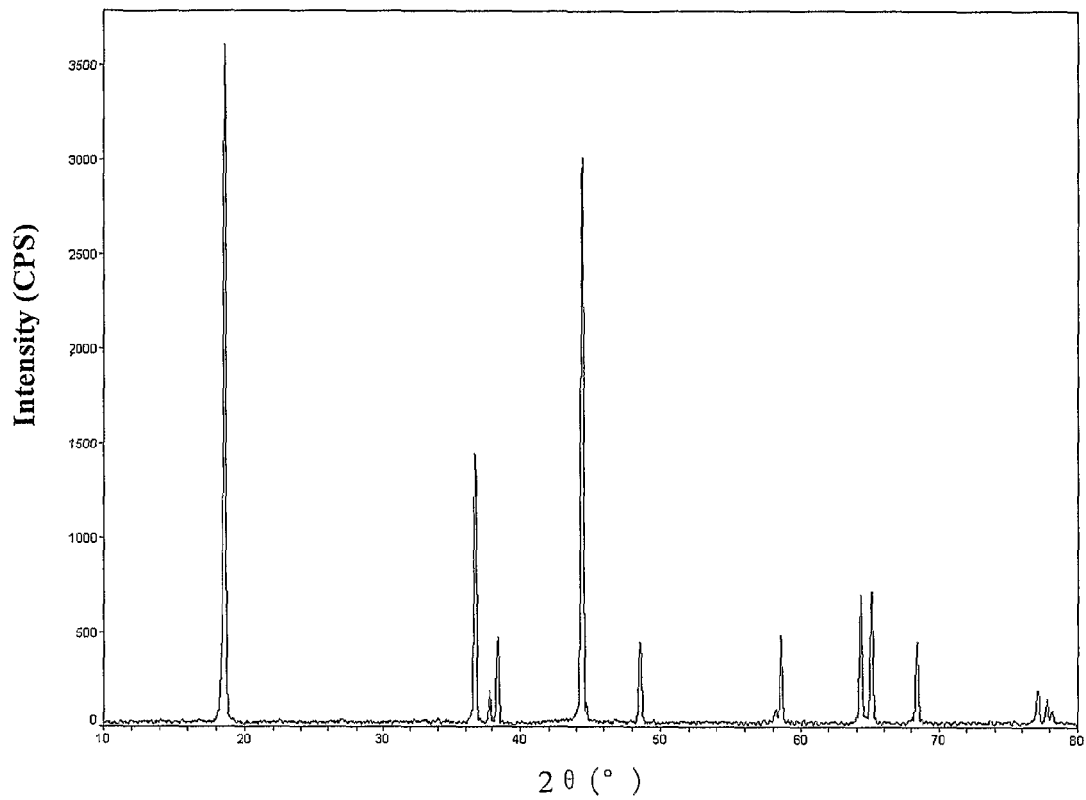
FIG. 1 is the XRD pattern of the positive electrode material, LiNi$_{1/3}$Mn$_{1/3}$Co$_{1/3}$O$_2$, provided by Example 1 of the present invention.

The process according to the present invention for preparing lithium-nickel-manganese-cobalt composite oxide used as a positive electrode material for the lithium ion battery, comprises subjecting a mixture containing a lithium compound and nickel-manganese-cobalt hydroxide to a first-stage sintering and a second-stage sintering, wherein said process further comprises adding a binder and/or binder solution after the first-stage sintering, and the mixture of the binder and/or binder solution and the product of first-stage sintering is sintered in the second-stage sintering.

Wherein the formula of lithium-nickel-manganese-cobalt composite oxide in the present invention is LiNi$_x$Mn$_y$Co$_{1-x-y}$O$_2$, and the formula of nickel-manganese-cobalt hydroxide is Ni$_x$Mn$_y$Co$_{1-x-y}$(OH)$_2$. In the above two formulas, $0.05 \leq x \leq 0.8$, $0.1 \leq y \leq 0.4$, and $x+y \leq 1$.

The binder according to the present invention may be various binders, e.g. one or more of water-soluble or water-insoluble binders. Said water-soluble binder includes polyvinyl alcohol, polytetrafluoroethylene, styrene-butadiene rubber, hydroxypropylmethyl cellulose, and sodium carboxymethyl cellulose. Said water-insoluble binder includes polyvinylidene fluoride, modified starch, modified cellulose, and polymer resins. Said modified starch includes esterified starch, etherified starch, and etc. Although the addition of a small amount of the binder can achieve the objective of the present invention, the ratio of the product of first-stage sintering to the binder is preferably 5:1 to 40:1 by weight, and more preferably 10:1 to 30:1 by weight. In order to mix the binder more uniformly with the product of first-stage sintering, it is preferred that the binder in a form of solution is mixed with the product of first-stage sintering. The concentration of the binder solution in the present invention is preferably 1-10% by weight, and more preferably 5-8% by weight. According to another preferred embodiment of this invention, the binder may also be rapidly and uniformly mixed with the product of first-stage sintering by pulverizing the product of first-stage sintering to increase the contact area of the binder and the product of first-stage sintering. The above two processes for uniformly mixing the binder and the product of first-stage sintering may be used either solely or jointly, and preferably used jointly. The particular operation conditions and procedure of the pulverization have been known to the skilled in the art. For example, a mortar, a ball mill, or a vibromill may be used for pulverization.

The ratio of the lithium compound to nickel-manganese-cobalt hydroxide in said mixture containing the lithium compound and nickel-manganese-cobalt hydroxide is preferably 1:1 to 2:1 by mole, and more preferably 1:1 to 1.2:1 by mole.

Said lithium compound may be an organic salt such as lithium oxalate and lithium acetate, inorganic salt such as lithium nitrate and lithium carbonate (Li$_2$CO$_3$), or hydroxide of lithium such as lithium hydroxide and hydrated lithium hydroxide.

Said nickel-manganese-cobalt hydroxide may be prepared by various processes such as the coprecipitation process. For example, CN 1622371A discloses a coprecipitation process wherein nickel-manganese-cobalt hydroxide is prepared through coprecipitation reaction by using soluble compounds of nickel, manganese, and cobalt as feed stocks, and hydroxides of alkali metals as precipitants. Said soluble nickel compounds may be various soluble nickel salts, preferably various water-soluble salts, and more preferably selected from the group consisting of nickel nitrate, nickel sulfate, nickel acetate, and nickel halides. Said soluble manganese compounds may be various soluble manganese salts, preferably various water-soluble manganese salts, and more preferably selected from the group consisting of manganese nitrate, manganese sulfate, and manganese halides. Said soluble cobalt compounds may be various soluble cobalt salts, preferably various water-soluble cobalt salts, and more preferably selected from the group consisting of cobalt nitrate, cobalt sulfate, and cobalt halides. The soluble nickel, manganese, and cobalt compounds are used in a ratio such that the mole ratio of nickel, manganese, and cobalt atoms in the soluble nickel, manganese, and cobalt compounds agrees with that in Ni$_x$Mn$_y$Co$_{1-x-y}$(OH)$_2$. For example, if Ni$_{2/5}$Mn$_{2/5}$Co$_{1/5}$(OH)$_2$ is to be prepared (i.e. x=y=2/5) and nickel nitrate (Ni(NO$_3$)$_2$), manganese nitrate (Mn(NO$_3$)$_2$), and cobalt sulfate (CoSO$_4$) are used as feed stocks, the mole ratio of the charged nickel nitrate, manganese nitrate, and cobalt sulfate should be 2:2:1. If Ni$_{1/3}$Mn$_{1/3}$Co$_{1/3}$(OH)$_2$ is to be prepared (i.e. x=y=1/3) and nickel nitrate (Ni(NO$_3$)$_2$), manganese nitrate (Mn(NO$_3$)$_2$), and cobalt sulfate (CoSO$_4$) are used as feed stocks, the mole ratio of the charged nickel nitrate, manganese nitrate, and cobalt sulfate should be 1:1:1. Said alkali metal hydroxides used as precipitants, may be one or more of sodium hydroxide, potassium hydroxide, and lithium hydroxide. Said particular operation conditions and procedure for coprecipitation reaction are known to the skilled in the art. For example, the coprecipitation reaction is preferably carried out for 5-15 hours at a temperature of 40-65° C. under stirring. The amount of said precipitant is preferably 1.5-10 times of the total mole of the nickel compound, manganese compound, and cobalt compound, and more preferably 2-2.5 times.

Only a physical mixture can be obtained by mixing the lithium compound with nickel-manganese-cobalt hydroxide through the conventional solid-state mixing process, therefore non-uniform distribution of lithium would inevitably occur during the sintering of the physical mixture, and thus the resulting positive electrode material would result in instability of the battery performance and poor cycle performance. To overcome the above disadvantages, the present inventors have conducted intensive studies on the uniform distribution of lithium element, and found that lithium may uniformly adhere on the surface of the suspended particles of nickel-manganese-cobalt hydroxide by first dissolving the lithium compound in a solvent to form a uniform solution, adding nickel-manganese-cobalt hydroxide Ni$_x$Mn$_y$Co$_{1-x-y}$(OH)$_2$ thereto and uniformly stirring, and then slowly remove the solvent to slowly precipitate lithium compound before the first-stage sintering of the lithium compound and nickel-manganese-cobalt hydroxide Ni$_x$Mn$_y$Co$_{1-x-y}$(OH)$_2$. Herein, the course of the slow precipitation of the lithium compound due to the slow decrease of the solvent is called "recrystallization" of the lithium compound. Such recrystallization permits lithium to more uniformly distribute in the obtained positive electrode material. It is known to the skilled in the art that it is an important factor affecting the cycle stability of the battery whether the distribution of lithium in the positive electrode material for the battery is uniform or not. Therefore, the uniformity of the distribution of lithium in the positive electrode material can be qualitatively examined by determining the cycle stability of the battery under the same conditions. It is proved by experiments that the mass specific capacity in the first discharge of the lithium ion battery containing the positive electrode material prepared by the "recrystallization" process of the present invention is 177.3 mAh/cm$^3$, the mass specific capacity in the twentieth discharge is 175.6 mAh/cm$^3$, and thus the variation rate of the mass specific capacity after 20 times of cycle discharge is only 0.96%. Meanwhile, the mass specific capacity in the first discharge of the lithium ion battery containing the positive electrode material prepared by the conventional process is 155.4 mAh/cm$^3$, the mass specific capacity in the twentieth cycle discharge is 144.2 mAh/cm$^3$, and thus the variation rate of the mass specific capacity after 20 times of discharge comes up to 7.21%. Therefore, the mixture used in the present invention containing lithium compound and nickel-manganese-cobalt hydroxide is preferably prepared by the "recrystallization" process of the present invention. The mixture containing lithium compound and nickel-manganese-cobalt hydroxide may also be sintered directly in the form of solution without removing the solvent. Said solvent may be various organic and/or inorganic solvents in the prior art as long as they can effectively dissolve the lithium compound. For example, said organic solvent may be one or more of methanol, ethanol, and acetone. The inorganic solvent is usually the deionized water. In the present invention, the concentration of the above lithium compound solution is not particularly limited, but the saturated solution of the lithium compound is generally preferred to reduce the time for evaporating the solvent. The particular operation of said solvent evaporation is known to the skilled in the art. For example, said solvent may be evaporated naturally at the ambient temperature with stirring, at the normal pressure by heating, or under vacuum depending on the boiling point and volatility of the solvent. For a solvent with high boiling point and low volatility, a combination of the above ways is preferred.

Said sintering may be carried out in various sintering equipments of the prior art such as a muffle furnace. The sintering temperature of said first-stage sintering is 450-700° C., and preferably 500-650° C., and the sintering time is 4-10 hours, and preferably 5-8 hours. The atmosphere for sintering may be air or oxygen, and preferably oxygen. The particular operation is known to the skilled in the art and the unnecessary details are omitted herein.

The sintering temperature of said second-stage sintering is 750-1100° C., and preferably 800-950° C., and the sintering time is 6-30 hours, and preferably 8-15 hours. The atmosphere for sintering may be air or oxygen, and preferably oxygen.

After the second-stage sintering, the lithium-nickel-manganese-cobalt composite oxide is obtained, and can be used as a positive electrode material after cooling and pulverizing.

The following examples will further describe the present invention.

Example 1

The present example is used to describe the process provided by the present invention for preparing $LiNi_{1/3}Mn_{1/3}Co_{1/3}O_2$ used as the positive electrode material.

1.03 mols $LiOH.H_2O$ was dissolved in 200 ml mixed solvent of deionized water and ethanol (1:1 by volume), and 1 mol nickel-manganese-cobalt hydroxide $Ni_{1/3}Mn_{1/3}Co_{1/3}(OH)_2$ was then added thereto. After uniformly mixing by stirring, in a muffle furnace the first-stage sintering was carried out at 600° C. in oxygen atmosphere for 5 hours. The product of first-stage sintering was pulverized in a mortar and then 100 g polyvinyl alcohol aqueous solution containing 5 g polyvinyl alcohol was added. After uniformly mixing by stirring, in the muffle furnace the second-stage sintering was carried out at 850° C. in oxygen atmosphere for 10 hours. After sintering, the material was cooled along with the furnace, and then pulverized by ball milling and passed through a 300 mesh screen to yield the final product $LiNi_{1/3}Mn_{1/3}Co_{1/3}O_2$.

The above $LiNi_{1/3}Mn_{1/3}Co_{1/3}O_2$ powder was analyzed with an IRIS Advantange 1000ICP-AES Type Plasma Emission Spectrometer and the determined contents of Li, Mn, Ni, and Co were 7.32% (theoretical value is 7.19%), 18.80% (theoretical value is 18.98%), 20.14% (theoretical value is 20.28%), and 20.11% (theoretical value is 20.36%), respectively. Size analysis was carried out with a MASTERSIZER Laser Size Analyzer and the median particle diameter was determined to be $D_{50}$=8.39 μm. The XRD pattern of the material was determined with D/MAX2200PC Type X-ray Diffractometer (Rigaku Industrial Corporation, Japan), and shown in FIG. 1.

Example 2

The present example is used to describe the process provided by the present invention for preparing $LiNi_{2/5}Mn_{2/5}Co_{1/5}O_2$ used as the positive electrode material.

The procedure of Example 1 was repeated to prepare the positive electrode material, $LiNi_{2/5}Mn_{2/5}Co_{1/5}O_2$, except that $Ni_{2/5}Mn_{2/5}Co_{1/5}(OH)_2$ was used as the nickel-manganese-cobalt hydroxide in place of $Ni_{1/3}Mn_{1/3}Co_{1/3}(OH)_2$ of Example 1.

The above $LiNi_{2/5}Mn_{2/5}Co_{1/5}O_2$ powder was analyzed with an IRIS Advantange 1000ICP-AES Type Plasma Emission Spectrometer and the determined contents of Li, Mn, Ni, and Co were 7.22% (theoretical value is 7.22%), 22.85% (theoretical value is 22.85%), 24.29% (theoretical value is 22.33%), and 12.25% (theoretical value is 12.25%), respectively. Size analysis was carried out with a MASTERSIZER Laser Size Analyzer and the median particle diameter was determined to be $D_{50}$=7.63 μm. The XRD pattern of the material was determined with D/MAX2200PC Type X-ray Diffractometer (Science Co., Japan), and shown in FIG. 2.

Example 3

The present example is used to describe the process provided by the present invention for preparing $LiNi_{1/3}Mn_{1/3}Co_{1/3}O_2$ used as the positive electrode material.

1 mol nickel nitrate, 1 mole manganese nitrate, and 1 mol cobalt nitrate were dissolved in 750 ml deionized water to prepare 4 mol/L solution, and 1500 ml NaOH aqueous solution of 4 mol/L was slowly added under stirring. The temperature of the solution was controlled at 50° C. After stirring for 8 hours, the precipitate was filtered and dried at 120° C. for 10 hours to yield nickel-manganese-cobalt hydroxide $Ni_{1/3}Mn_{1/3}Co_{1/3}(OH)_2$. 1.05 mols $LiNO_3$ was dissolved in 220 ml deionized water, and after $LiNO_3$ was completely dissolved, 1 mol $Ni_{1/3}Mn_{1/3}Co_{1/3}(OH)_2$ precursor was added. After slowly removing water by evaporation at 65° C. under stirring, in a muffle furnace the first-stage sintering was carried at 650° C. in oxygen atmosphere for 4 hours. The obtained product of the first-stage sintering was pulverized and then 200 g polytetrafluoroethylene aqueous solution containing 9 g polytetrafluoroethylene was added. After uniformly mixing, in the muffle furnace the second-stage sintering was carried out at 800° C. in oxygen atmosphere for 15 hours. After sintering, the material was cooled along with the furnace, and then pulverized by ball milling and passed through a 300 mesh screen to yield the final product $LiNi_{1/3}Mn_{1/3}Co_{1/3}O_2$.

The above $LiNi_{1/3}Mn_{1/3}Co_{1/3}O_2$ powder was analyzed with an IRIS Advantange 1000ICP-AES Type Plasma Emission Spectrometer and the determined contents of Li, Mn, Ni, and Co were 7.28%, 18.76%, 20.16%, and 20.12%, respectively. Size analysis was carried out with a MASTERSIZER Laser Size Analyzer and the median particle diameter was determined to be $D_{50}$=7.37 µm.

Example 4

The present example is used to describe the process provided by the present invention for preparing $LiNi_{2/5}Mn_{2/5}Co_{1/5}O_2$ used as the positive electrode material.

0.52 mol $Li_2CO_3$ and 1 mol $Ni_{2/5}Mn_{2/5}Co_{1/5}(OH)_2$ were uniformly mixed in solid phase, and then the first-stage sintering was carried out at 550° C. in oxygen atmosphere for 8 hours in a muffle furnace. The obtained product of the first-stage sintering was pulverized and then 100 g styrene-butadiene rubber aqueous solution containing 3.5 g styrene-butadiene rubber was added. After uniformly mixing, the second-stage sintering was carried out at 900° C. in oxygen atmosphere for 15 hours in the muffle furnace. After sintering, the material was cooled along with the furnace, pulverized by ball milling, and then passed through a 300 mesh screen to yield the final product $LiNi_{2/5}Mn_{2/5}Co_{1/5}O_2$.

The above $LiNi_{2/5}Mn_{2/5}Co_{1/5}O_2$ powder was analyzed with an IRIS Advantange 1000ICP-AES Type Plasma Emission Spectrometer and the determined contents of Li, Mn, Ni, and Co were 7.10%, 22.83%, 24.32%, and 12.23%, respectively. Size analysis was carried out with a MASTERSIZER Laser Size Analyzer and the median particle diameter was determined to be $D_{50}$=8.17 µm.

Example 5

The present example is used to describe the process provided by the present invention for preparing $LiNi_{2/5}Mn_{2/5}Co_{1/5}O_2$ used as the positive electrode material.

The procedure of Example 2 was repeated to prepare the positive electrode material, $LiNi_{2/5}Mn_{2/5}Co_{1/5}O_2$, except that the binder styrene-butadiene rubber was added directly in the form of powder.

The above $LiNi_{2/5}Mn_{2/5}Co_{1/5}O_2$ powder was analyzed with an IRIS Advantange 1000ICP-AES Type Plasma Emission Spectrometer and the determined contents of Li, Mn, Ni, and Co were 7.35%, 22.86%, 24.25%, and 12.27%, respectively. Size analysis was carried out with a MASTERSIZER Laser Size Analyzer and the median particle diameter was determined to be $D_{50}$=7.94 µm.

Comparative Example 1

This comparative example is used to describe the process for preparing $LiNi_{1/3}Mn_{1/3}Co_{1/3}O_2$ used as the positive electrode material, without adding the binder after the first-stage sintering.

The procedure of Example 1 was repeated to prepare the positive electrode material, $LiNi_{1/3}Mn_{1/3}Co_{1/3}O_2$, except that no binder was added after the first-stage sintering.

Comparative Example 2

This comparative example is used to describe the process for preparing $LiNi_{2/5}Mn_{2/5}Co_{1/5}O_2$ used as the positive electrode material, without adding the binder after the first-stage sintering The procedure of Example 4 was repeated to prepare the positive electrode material, $LiNi_{2/5}Mn_{2/5}Co_{1/5}O_2$, except that no binder was added after the first-stage sintering.

Performance Test

The tap densities of the positive electrode materials prepared in above Examples 1-5 and comparative examples 1-2 were determined with BT-1000 Type Powder Comprehensive Character Test Instrument, and the results are shown in Table 1.

Figure 2:
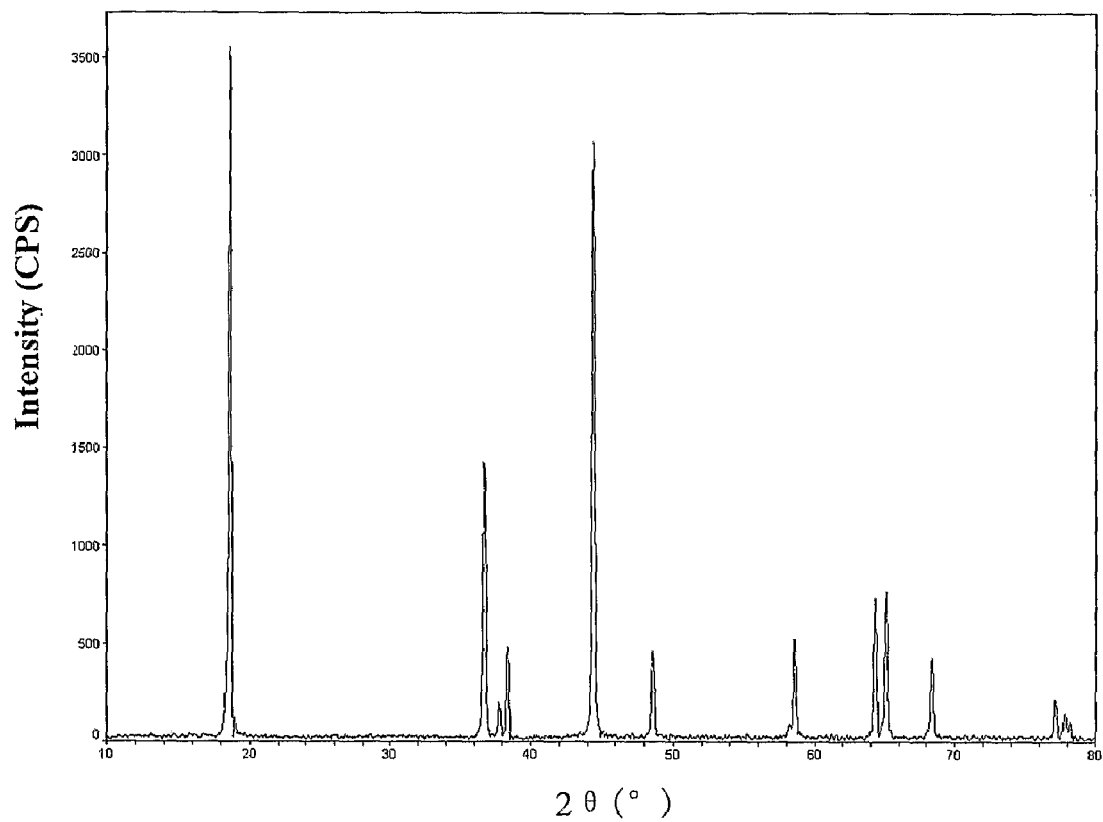
FIG. 2 is the XRD pattern of the positive electrode material, LiNi$_{2/5}$Mn$_{2/5}$Co$_{1/5}$O$_2$, provided by Example 2 of the present invention.

Charge-discharge test: the positive electrode materials lithium-nickel-manganese-cobalt composite oxide prepared in above Examples 1-5 and comparative examples 1-2 were used as positive electrodes and metal lithium sheets as negative electrodes to assemble button batteries, and charge-discharge test of 0.5 C multiplying factor was carried out in the voltage range of 3.0-4.3V to examine the electrochemical performance of each positive electrode material. The results of the first discharge are shown in FIGS. 1-2, wherein the mass specific capacity in the first discharge, the volume specific capacity in the first discharge, and the mass specific capacity in the twentieth cycle discharge are shown in Table 1 below.

TABLE 1

| Example No. | Tap density (g/cm$^3$) | Mass specific capacity in first discharge (mAh/g) | Volume specific capacity in first discharge (mAh/cm$^3$) | Mass specific capacity in twentieth cycle discharge (mAh/g) |
|---|---|---|---|---|
| Example 1 | 2.4 | 177.3 | 425.5 | 175.6 |
| Example 2 | 2.4 | 172.1 | 413.0 | 170.1 |
| Example 3 | 2.3 | 175.6 | 403.9 | 171.3 |
| Example 4 | 2.4 | 173.5 | 416.4 | 161.8 |
| Example 5 | 2.2 | 168.8 | 371.4 | 168.4 |

TABLE 1-continued

| Example No. | Tap density (g/cm$^3$) | Mass specific capacity in first discharge (mAh/g) | Volume specific capacity in first discharge (mAh/cm$^3$) | Mass specific capacity in twentieth cycle discharge (mAh/g) |
|---|---|---|---|---|
| C.E.* 1 | 1.8 | 153.7 | 276.7 | 152.9 |
| C.E.* 2 | 1.9 | 155.4 | 295.3 | 144.2 |

Note:
*C.E. represents Comparative Example.

It can be seen from the results in above Table 1 that the positive electrode materials prepared by the process provided by the present invention possessed higher tap density and specific capacity compared with the positive electrode materials prepared by the conventional process. Besides, the uniformity of the distribution of lithium element can be enhanced by fully mixing the lithium compound and nickel-manganese-cobalt hydroxide in the solvent, the prepared materials meet stoichiometry, and thereby the cycle stability of the material is greatly enhanced.

We claim:

1. A process for preparing lithium-nickel-manganese-cobalt composite oxide used as a positive electrode material for the lithium ion battery, comprising subjecting a mixture containing a lithium compound and nickel-manganese-cobalt hydroxide to a first-stage sintering and a second-stage sintering, wherein said process further comprises adding a binder and/or binder solution after the first-stage sintering, and the mixture of the binder and/or binder solution and the product of first-stage sintering is sintered in the second-stage sintering.

2. The process according to claim 1, wherein a formula of said lithium-nickel-manganese-cobalt composite oxide is LiNi$_x$Mn$_y$Co$_{1-x-y}$O$_2$, and the formula of nickel-manganese-cobalt hydroxide is Ni$_x$Mn$_y$Co$_{1-x-y}$(OH)$_2$, in both formulas 0.05≦x≦0.8, 0.1≦y≦0.4, and x+y≦1.

3. The process according to claim 1, wherein a ratio of said product of the first-stage sintering to the binder is 5:1 to 40:1 by weight.

4. The process according to claim 3, wherein the ratio of said product of the first-stage sintering to the binder is 10:1 to 30:1 by weight.

5. The process according to claim 1, wherein said binder is a water-soluble or a water-insoluble binder.

6. The process according to claim 5, wherein said water-soluble binder is selected from the group consisting of carboxymethylcellulose sodium, polytetrafluoroethylene, styrene-butadiene rubber, hydroxypropylmethyl cellulose, and polyvinyl alcohol, and the water-insoluble binder is selected from the group consisting of polyvinylidene fluoride, modified starch, modified cellulose, and polymer resins.

7. The process according to claim 1, wherein a concentration of said binder solution is 1-10% by weight.

8. The process according to claim 1, wherein the product of first-stage sintering is pulverized prior to adding the binder and/or binder solution.

9. The process according to claim 1, wherein said first-stage sintering is carried out at a temperature of 450-700° C. for 4-10 hours, and said second-stage sintering is carried out at a temperature of 750-1100° C. for 6-30 hours.

10. The process according to claim 1, wherein the ratio of the lithium compound to nickel-manganese-cobalt hydroxide in the mixture containing the lithium compound and nickel-manganese cobalt hydroxide is 1:1 to 1.2:1 by mole.

11. The process according to claim 10, wherein the process for preparing said mixture containing the lithium compound and nickel-manganese cobalt hydroxide comprises dissolving the lithium compound in a solvent, adding nickel-manganese-cobalt hydroxide, stirring to uniformly mix, and recrystallizing the lithium compound by slowly removing the solvent.

12. The process according to any of claim 1, wherein the lithium compound is selected from the group consisting of lithium carbonate, lithium nitrate, lithium hydroxide, hydrated lithium hydroxide, lithium oxalate, and lithium acetate.

* * * * *